INVENTORS
ALBERT S. RETTIG &
BY DAVID Z. COHEN

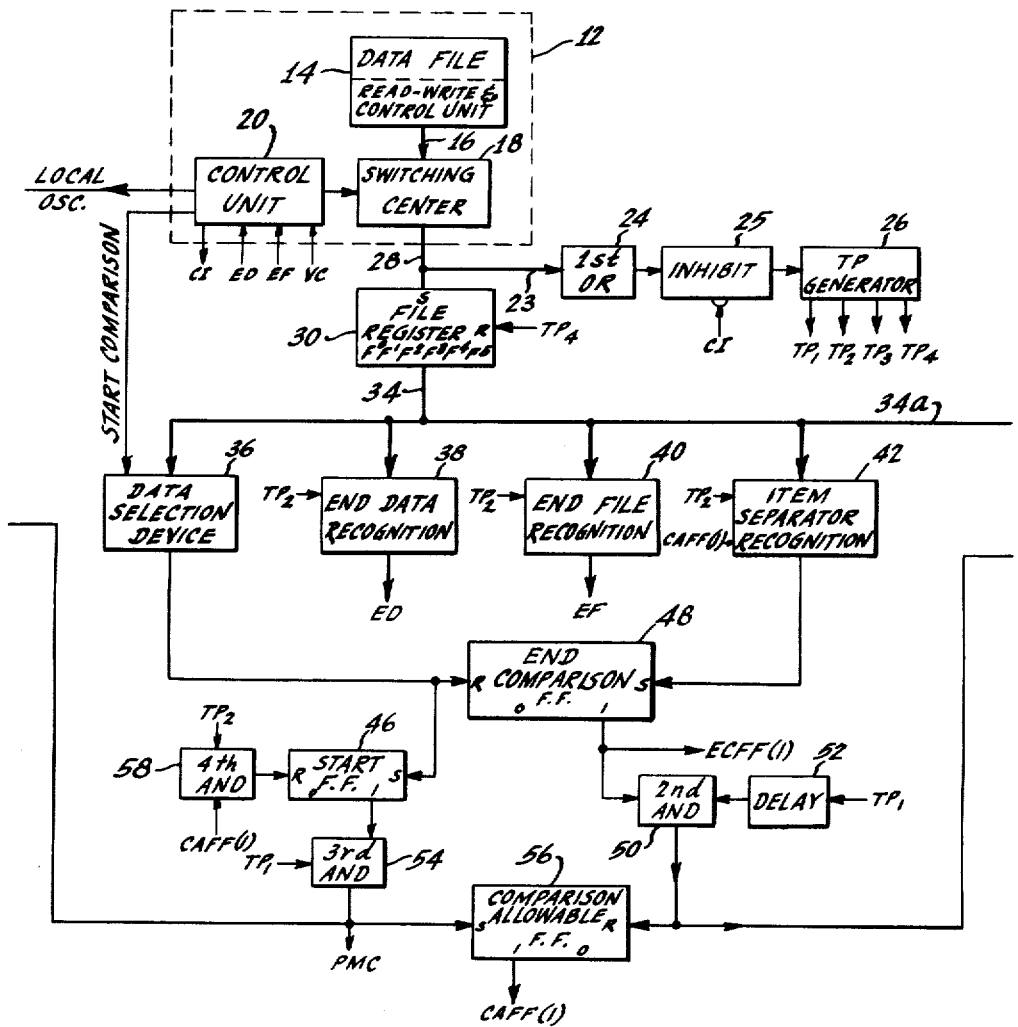

John V. Regan
ATTORNEY

United States Patent Office 3,197,742
Patented July 27, 1965

3,197,742
SEARCH APPARATUS
Albert S. Rettig, Haddonfield, N.J., and David Z. Cohen, Tel Aviv, Israel, assignors to Radio Corporation of America, a corporation of Delaware
Filed Jan. 11, 1960, Ser. No. 1,707
13 Claims. (Cl. 340—172.5)

This invention relates to apparatus for searching a message file, and more particularly to methods of and means for locating on a message file in a single pass all messages having certain common characteristics.

In many large-scale information handling machines, digital computers for example, large volumes of data are often stored in external memory files. The data may be grouped into messages each containing one or more related items of information, such as customer's name, address, account number, and other relevant information. The messages are usually arranged in the file according to some desired sequence or address, which may be, for example, alphabetical by customer's last names, and the items are arranged in the same sequence in each message.

It frequently is necessary to perform a class search of the file to locate all messages having certain predetermined characteristics in common. Moreover, the common characteristics may be non-consecutive message characters. By way of example, the criterion of search may be the first, second, fifth and seventh characters of the account items, and it may be required to locate and extract all messages wherein these account characters match the search criterion.

Devices are known for searching a file for one particular message or group of messages each having one or more consecutively occurring characters which match a search criterion. However, when, as in the above example, non-consecutive characters form the basis of search, several passes on the file are generally required, each pass corresponding to a search based on a different common character. The file for each pass may be the messages extracted during the previous pass. An inordinate amount of time may be consumed in performing a search according to the above method, especially when the number of characters in the search criterion is large.

Accordingly, it is an object of the present invention to provide improved means for and method of performing a search of a message file.

It is another object of this invention to provide apparatus for performing a class search of a message file.

It is still another object of this invention to provide means for searching a message file in a shorter time interval than has heretofore been possible.

It is a further object of the present invention to provide, in a system wherein non-consecutive occurring characters form the basis of search, means for performing such a search in a shorter time interval than has heretofore been possible and with a reduced number of components.

Yet another object of the invention is to provide means for performing a search of a message file by comparing a search criterion with portions of the file message criteria.

Still another object of the present invention is to provide economical and flexible apparatus for performing a high-speed search of a message file.

In accordance with the present invention, the characters which form the basis of search occupy the same character positions in the search criterion as the common characters of the message criteria occupy, with respect to a reference position, in the desired messages. Other character positions in the search criterion may be masked over with special character masking symbols. The message criteria characters are compared seriatim with the search criterion characters in a comparator device, which signals comparison when the compared characters are equal. Means are provided for recognizing the aforesaid special masking symbols and for generating a comparison signal in response thereto.

In the accompanying drawing, like components are designated by like reference characters, and:

FIGURES 1A, 1B and 1C, when taken together, form FIGURE 1, which is a block diagram of a search apparatus according to the present invention, and which includes portions of an information handling system in which the invention may be practiced;

Figure 1A:
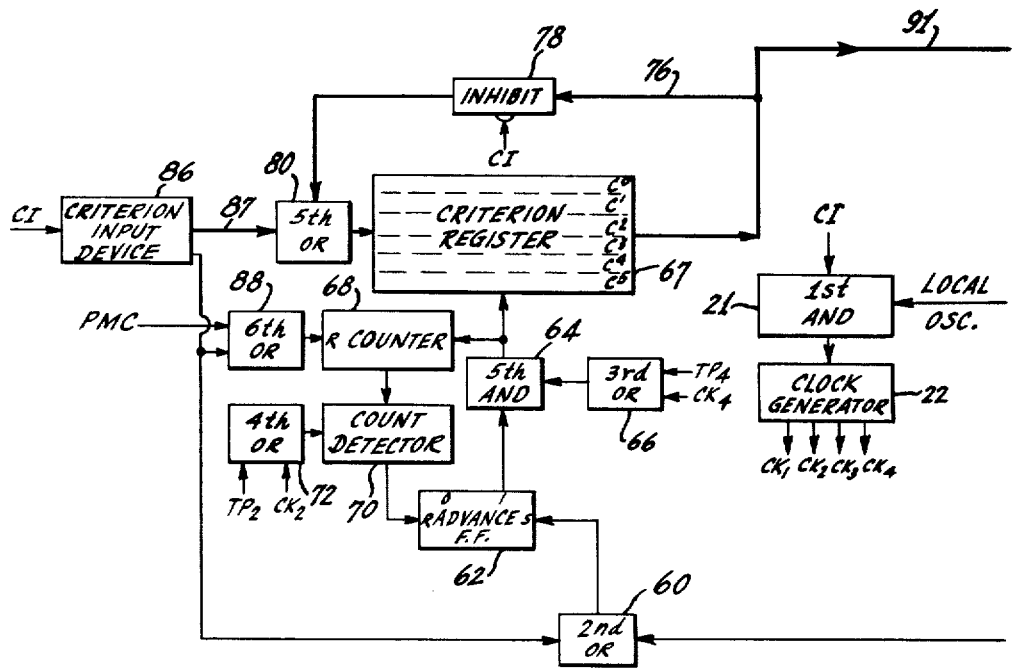
Figure 1:
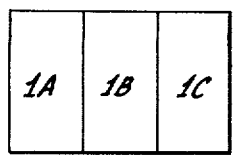
Figure 1C:
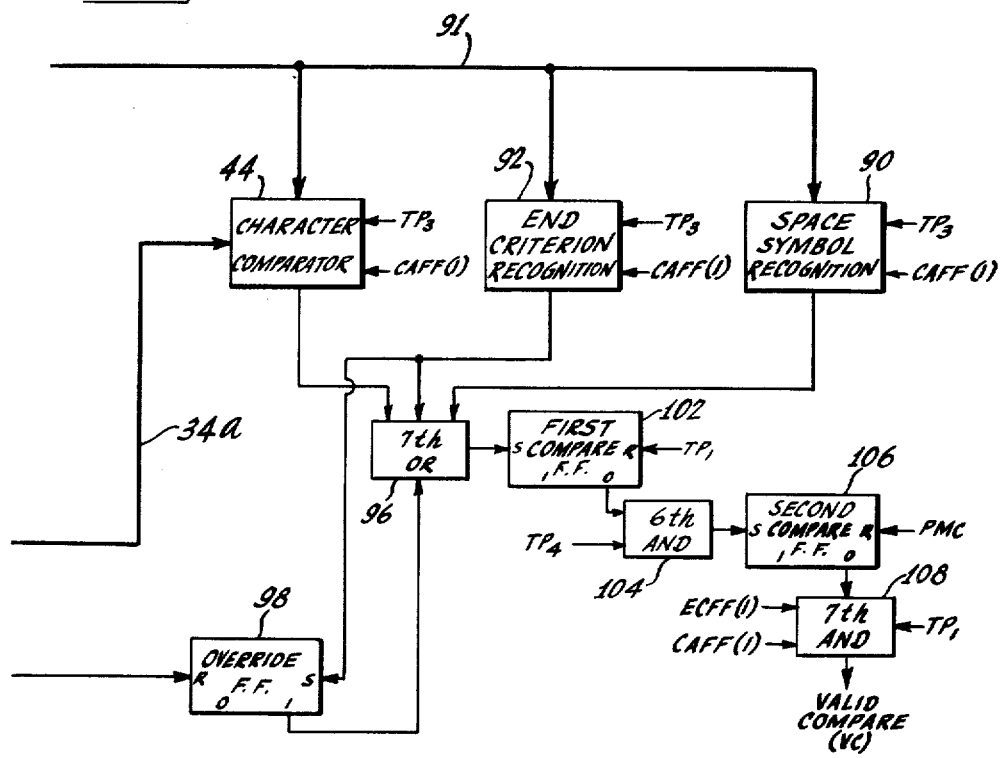

A search apparatus in accordance with the invention is illustrated in FIGURES 1A, 1B and 1C. A data processing system may constitute the general environment for practicing the present invention. A portion of one such system is shown within the dashed box 12 of FIGURE 1B in order better to aid the reader in understanding the invention. Such a system may include a data file 14 comprising, for example, one or more magnetic tape stations, means for controlling the motion and direction of motion of the tapes individually, the required number of read and write heads, etc. The data file 14 may also be a magnetic storage drum, disc., or other suitable storage medium. A multichannel cable 16 containing control signal lines and data lines connects each of the file units of the data file 14 to a switching center 18. The switching center 18 may be a crossbar or relay type switching device which addresses the file units selectively upon receipt of signals from a control unit 20, and which provides a connection between the selected file unit and the search apparatus.

The control unit 20 may be, for example, a computer or a console. Included within the control unit 20 is a local oscillator (not shown). The output of the local oscillator, which runs continuously, is applied to one input of a first "and" gate 21 (FIGURE 1A). An "and" gate, for purposes of this discussion, is a coincidence gate whose output is energized when and only when every one of its inputs is in its prescribed state. In an "$n$" input "and" gate, the gate is "primed" when signals are applied to some, but not all of the "$n$" inputs. The gate is "activated" when the proper signals are applied to all "$n$" inputs. The second input to the first "and" gate 21 is a control level signal (CI) provided by the control unit 20 whenever it is desired to change the criterion of search. This aspect will be described more fully hereinafter. The output of the first "and" gate 21 is applied as a triggering pulse to a clock generator 22, which generates a series of the clock pulses $CK_1-CK_4$ in response to each triggering pulse. The clock generator 21 may be, for example, a tapped delay line.

For illustrative purposes only, the invention will be described in connection with one known information handling system in which data are represented by binary coded characters each comprising six binary digits recorded in parallel, that is to say, in a row transverse to the direction of drum or tape travel. The characters are arranged seriatim into items and messages. An item consists of such characters as are necessary to specify a particular unit of information such as name, account number, etc. A message in this system consists of a start message (SM) symbol followed by an item separator (ISS) symbol, one or more related items of information each followed by an (ISS) symbol, and an end message (EM) symbol in that order. The various related items appear in the same order sequence in all messages, although the number of characters in any item may vary from message to message. The last message on a tape (or set of drum tracks) is followed by a special symbol, here termed the end data (ED) symbol. The last message of the file is followed by an end of file (EF) symbol. Each of the above-mentioned symbols is a unique combination of the six bits. It will be apparent to one skilled in the art that the system may be easily adapted for use with a data file 14 wherein the character bits are recorded in series. A series-to-parallel converter (not shown) may provide this adaptation.

The six bit character output of the switching center 18 is applied over a multichannel cable 23 to a first "or" gate 24. An "or" gate, for purposes of this discussion, is a gate whose output is energized when any one or more of its inputs is in its prescribed state. The single output of the first "or" gate 24 is applied as one input to an inhibit gate 25. An inhibit gate may be defined as a gate whose output is enabled when all inputs are in the prescribed state, provided that no inhibiting signal is present. The inhibiting input to the inhibit gate 25 is the control level signal, CI, from the control unit 20. The small semicircle at the inhibit gate 25 identifies the inhibiting input terminal. When the CI level is applied at the inhibiting input, no output is provided by the inhibit gate 25 in response to an input from the first "or" gate 24. The output of the inhibit gate 25 is connected as the input to a timing pulse (TP) generator 26 which generates a series of timing pulses $TP_1$–$TP_4$ in response to each input signal. The TP generator 26 may be, for example, a tapped delay line.

The switching center 18 output is also applied over a multichannel cable 28 to a one-character interim storage register 30. The register 30 may be a set of six independent bistable flip-flops $F^0$–$F^5$ having separate set and reset input terminals. Each set terminal is connected to receive a different output from the switching center 18. The $TP_4$ timing pulse is applied simultaneously to all of the reset terminals to clear the register 30 for receipt of the next character.

The file register 30 is connected by a multichannel cable 34 to a data selection device 36, an end data (ED) recognition gate 38, an end of file (EF) recognition gate 40, and an item separator symbol (ISS) recognition gate 42. Multichannel cable 34a connects the output of the file register 30 to a character comparator 44 (FIGURE 1C). The comparator 44 is described more fully hereinafter. The data selection device 36 selects the criterion portion of each message which is to be compared with the search criterion. One form of selection device 36 suitable for practicing the present invention is disclosed in the copending application of L. A. F. Rivas, Serial No. 431,627, filed May 24, 1954, for "Data Selection Device," and assigned to the assignee of the present invention. As described in the copending application, the device 36 provides a data select signal during a selected portion of each message. The signal may be provided after a preselected number of items following an SM symbol, or after a preselected number of characters following a predetermined number of items are by-passed, depending upon the setting of the data selection device 36. For purposes of the present invention, it is desired that the data select signal be a pulse of short duration rather than a level lasting for several characters. To this end, a data select pulse signal may be derived from the output of the second control "and" gate 74, illustrated in FIGURE 2 of the Rivas application. Operation of the data selection device 36 herein is enabled by a start comparison signal from the control unit 20.

Each of the recognition gates 38, 40, 42 is arranged to recognize a different one of the special symbols appearing in the message format. The end data (ED) recognition gate 38, for example provides an output signal only when the ED symbol is present in the file register 30, and when the $TP_2$ timing pulse is applied simultaneously to the ED gate 38. A suitable form of recognition gate is described in the aforementioned Rivas application. When the Rivas type of recognition gate is employed in the present invention, the output of the inverter amplifier 96 of Rivas may be applied to one input of a two-input "and" gate together with the $TP_2$ timing pulse applied to the second input. The ED and EF output signals from the recognition gates 38, 40, respectively, are applied to the control unit 20 of the data processing system.

The output of the data selection device 36 is connected to the set input terminal of a start flip-flop 46 and to the reset input terminal of an end of comparison flip-flop 48. The output of the item separator (ISS) recognition gate 42 is connected to the set terminal of the latter flip-flop 48. A flip-flop, as is well known, has two stable states, and may comprise a symmetrical arrangement of two sections which provide simultaneous outputs of different amplitudes. Because of the symmetry of the two sections, the outputs provided from the sections may be reversed to provide an opposite steady state condition. In this discussion, a signal applied to the input of one section causes the flip-flop to provide a useable output from that section. The inputs and outputs of the flip-flops have been given particular designations in the drawing. One section has a set "S" input and a corresponding "1" output. The other section has a reset "R" input and a "0" output.

The "1" output terminal of the end of comparison flip-flop 48 is connected to one input of a second "and" gate 50. The $TP_1$ timing pulse is applied to the other input of the second "and" gate 50 through a delay 52. The delay duration is adjusted to be less than the interval between timing pulses $TP_1$ and $TP_2$ for reasons which will be apparent from a later discussion. The second "and" gate 50 is "primed" to pass the delayed $TP_1$ signal only when the end of comparison flip-flop 48 is in its set state. A control signal ECFF(1) is also provided at the "1" output terminal of the end of comparison flip-flop 48 at this time. The symbol "ECFF" is an abbreviation of "end of comparison flip-flop." The (1) following ECFF symbol designates the output terminal from which the signal is derived.

The output from the "1" terminal of the start flip-flop 46 is applied to a third "and" gate 54 together with the $TP_1$ timing pulse. The output of the third "and" gate 54 is connected to the set input terminal of a comparison allowable flip-flop (CAFF) 56. This flip-flop 56 provides a CAFF(1) control signal at its "1" output terminal when the flip-flop 56 is in the set state. The output of the second "and" gate 50 is connected to the reset input terminal of the comparison allowable flip-flop 56. The CAFF(1) signal primes a fourth "and" gate 58 and allows the $TP_2$ timing pulse to reset the start flip-flop 46. The CAFF(1) signal is also applied as a control signal to various other portions of the search apparatus.

The output of the third "and" gate 54 is applied also to one input terminal of a second "or" gate 60 (FIGURE 1A) and as a "prepare to make comparison" control signal, PMC, to other parts of the search apparatus. "PMC" is an abbreviation for "prepare to make comparison." The second "or" gate 60 output is connected to the set input terminal of an advance flip-flop 62, the "1" output terminal of which is connected to one input of a fifth "and" gate 64. The $TP_4$ timing pulse and the $CK_4$ clock pulse are applied to the inputs of a third "or" gate 66, the output of which is connected to another input of the fifth "and" gate 64. The output of the fifth "and" gate 64 is connected to the "advance" terminal of a search criterion register 67 and to the trigger input of a counter 68. The counter 68 may be, for example, a binary counter comprising a plurality of flip-flop stages. Each output pulse from the fifth "and" gate 64 steps up the count in the counter 68 by one count. A count detector 70, which may be a recognition gate, for example, is connected to the output of the counter 68. The count detector 70 provides a signal for resetting the advance flip-flop 62 upon the simultaneous occurrence of the preselected output from the counter 68 and either the $TP_2$ timing pulse or the $CK_2$ clock pulse, applied to the count detector 70 by way of a fourth "or" gate 72.

The search criterion is stored in the criterion register 67 such that all bits of a character are read out in parallel, and the characters are read out seriatim. The register 67 may comprise, for example, six serial shift registers, one for each bit position of the criterion characters. The six registers are designated $C^0$–$C^5$ in FIGURE 1A. Register $C^0$, for example, may store all of the bits in the $2^0$ positions of the search criterion characters. The number of serial storage positions is determined by the maximum length of criterior that is expected to be used in a search operation. Assuming that each of the six serial registers "$n$" stages, the counter 68 must be capable of counting to "$n$," and the count detector 70 is arranged to provide an output when the counter 68 reaches the count of "$n$," for reasons which will be apparent from a later description of the operation of the apparatus.

Figure 2:
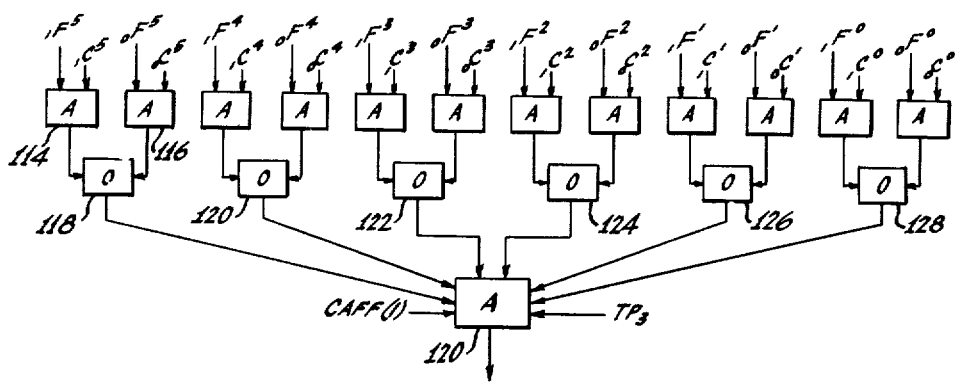
FIGURE 2 is a block diagram of one form of character comparator suitable for use in the search apparatus of FIGURE 1.

When the character comparator 44 of FIGURE 1C has the form illustrated in FIGURE 2, the criterion register 67, or at least the output stages thereof, is preferably of the flip-flop type because both the "1" and "0" outputs of the register are employed by the comparator 44. It will be apparent to those skilled in the art, however, that this requirement may be obviated by the use of a different type of comparator 44, for example one actuated by pulse signals rather than levels.

The criterion register 67 (FIGURE 1A) is made circulatory by a feedback loop comprising multichannel cable 76, inhibit gates 78, and fifth "or" gates 80. Although the inhibit gates 78 and the fifth "or" gates 80 are illustrated by single blocks in FIGURE 1A, it is to be understood that a separate inhibit gate and a separate fifth "or" gate are connected in each feedback channel. The inhibit gates 78 provide through-paths in the feed-back channels, except during the presence of the CI inhibiting signal provided by the control unit 20 (FIGURE 1B) when a new search criterion is being written into the criterion register 67 (FIGURE 1A) from a criterion input device 86. The outputs of the criterion input device 86 are applied to the criterion register 67 by way of the fifth "or" gates 80. The criterion input device 86 may be, for example, a punched paper tape reader (not shown) activated by the criterion input (CI) signal from the control unit 20.

An output signal pulse is provided by the criterion input device 86 when that device 86 is activated by the CI control level. This output signal pulse is applied to the second input of the second "or" gate 60 for setting the advance flip-flop 62. The output signal pulse is also applied to one input of a sixth "or" gate 88, the output of which is connected to the reset terminal of the counter 68. The PMC control signal from the third "and" gate 54 is applied to a second input of the sixth "or" gate 88.

The outputs of the criterion register 67 are connected by multichannel cable 90 to the comparator 44 and to two masking symbol recognition gates 90 and 92 (FIGURE 1C). The space symbol recognition gate 90 and the end of criterion symbol recognition gate 92 may be of the same general type illustrated in the aforementioned Rivas copending application and discussed hereinabove. The CAFF(1) control level and the $TP_3$ timing pulses are appliesd as priming signals to the outputs of the comparator 44 and the recognition gates 90 and 92.

The outputs of the character comparator 44, the space symbol recognition gate 90, and the end of criterion recognition gate 92 are connected respectively to three of the inputs of a four-input, seventh "or" gate 96. The fourth input of the seventh "or" gate 96 is connected to the "1" output terminal of an override flip-flop 98. This flip-flop 98 is set by the output of the end of criterion recognition gate 92, and reset by the output of the second "and" gate 50 (FIGURE 1B).

The output of the seventh "or" gate 96 is connected to the set input terminal of a first compare flip-flop 102. Timing pulses $TP_1$ are applied o the reset input terminal of the compare flip-flop 102. The "0" output of the flip-flop 102 is applied to one input of a sixth "and" gate 104, and primes the "and" gate 104 when the flip-flop 102 is in the reset state. A timing pulse $TP_4$ applied to a second input of the sixth "and" gate 104 is passed to the set input terminal of a second compare flip-flop 106 when the sixth "and" gate 104 is primed. The PMC control signal is applied to the reset input terminal of the second compare flip-flop 106.

A four-input, seventh "and" gate 108 is connected to receive at its inputs the "0" output of the second compare flip-flop 106, the $TP_1$ timing pulses, and control levels CAFF(1) and ECFF(1), respectively. The seventh "and" gate 108 provides an output, designated valid compare (VC), whenever the search criterion matches a predetermined portion of the message output from the file 14.

One form of comparator 44 suitable for practicing the invention is illustrated in block form in FIGURE 2. Blocks designated therein "A" and "O," respectively, represent "and" gates and "or" gates. The inputs "C" and "F" to the 'and" gates are the outputs, respectively, of the criterion register 67 (FIGURE 1A) and the file register 30 of FIGURE 1B. The numerical superscript following an input designation denotes the channel from which the input is obtained; the numerical subscript preceding an input designation denotes the '1" or "0" output of the channel. Consider, by way of example, the inputs to the leftmost "and" gate 114. The input $_1F^5$ is the "1" output of the $F^5$ channel of the file register 30. The input $_1C^5$ is the "1" output of the $C^5$ channel of the criterion register 67.

As may be seen in FIGURE 2, the outputs of each register 30, 67 stage are connected to a pair of "and" gates (A). Each such pair of "and" gates and its associated "or" gate (O) operate in a similar manner, and only the left-most pair will be described in detail. The "and" gate 114 provides an output only when both inputs thereto are high, that is to say, only when the elements $F^5$ and $C^5$ in the file register 30 and criterion register 67, respectively, are each storing a binary "1." In the case of flip-flop registers, this condition obtains when both flip-flops are in the set condition. In like manner, the second "and" gate 116 provides an output only when the $F^5$ and $C^5$ storage elements each are storing a binary "0." The outputs of the "and" gates 114, 116 are connected to a two-input "or" gate 118. The output of the "or" gate 118 is connected to one input of an eight-input "and" gate 120. It is apparent from the above discussion that no output signal is coupled to the "and" gate 120 from "or" gate 118 when the $2^5$ bit of the output criterion character and the $2^5$ bit of the corresponding message character are not identical.

The outputs of the other "or" gates 120–128 are connected, respectively, to the second through the sixth inputs of the "and" gate 120. The first six inputs of the "and" gate 120 are all energized only when the character stored in the output section of the criterion register 67 matches the character stored in the file register 30. The CAFF(1) control level is applied to the seventh input of the "and" gate 120 during the search operation. An output is provided by the "and" gate 120 in response to the $TP_3$ timing pulse when the other seven inputs thereto are each in the prescribed state.

*A typical problem solving routine*

It is believed that the invention may be appreciated more readily and its operation better understood by consideration of a realistic problem-solving routine. Assume that the messages in the file 14 pertain to motor vehicle registrations and that the information in each message is arranged in the following sequence:

Start message symbol (SM)
Item separator symbol (ISS)
Name of registrant
ISS
Street address
ISS
City
ISS
County
ISS
Vehicle registration number (license number)
ISS
Model of vehicle
ISS
Other relevant items of information (each followed by an ISS symbol)
End message symbol (EM)

The license number of registrant's vehicle is contained in the fifth item of his message, and it will be observed that this data begins after the fifth item separator symbol (ISS) following the start message symbol (SM).

Figure 3:
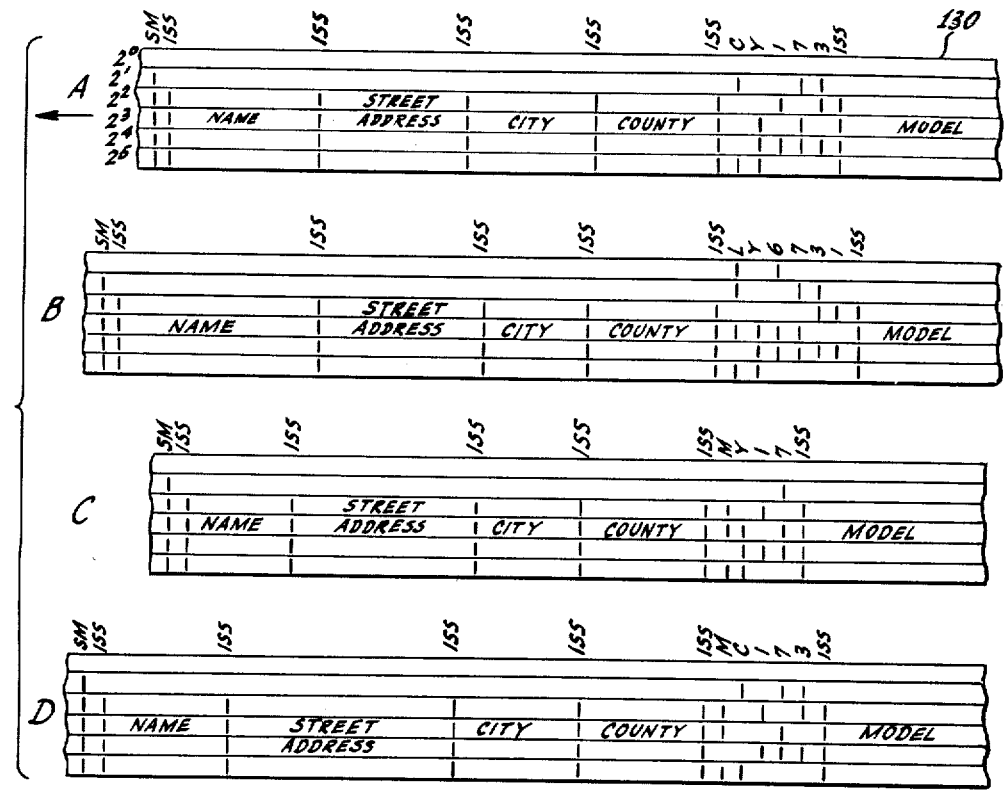
FIGURES 3A, 3B, 3C and 3D are different record portions of a message file illustrating the message format.

Reference should now be made to FIGURE 3, wherein are shown portions of four different messages as they might appear at random in the file 14. Only the data of the fifth items and the ISS and SM symbols are expressed in coded form in FIGURE 3. It should be understood, however, that the name, address, etc., also are expressed in code in the actual file messages. The following table lists the pertinent characters used in FIGURE 3 (and FIGURE 4), together with their binary coded equivalents. The criterion space symbol and the end of criterion symbol are respectively designated CS and EC in the table and in FIGURE 4.

| Character | Bit Value | | | | | |
|---|---|---|---|---|---|---|
| | $2^5$ | $2^4$ | $2^3$ | $2^2$ | $2^1$ | $2^0$ |
| C | 1 | 0 | 0 | 0 | 1 | 0 |
| L | 1 | 0 | 1 | 0 | 1 | 1 |
| M | 1 | 0 | 1 | 1 | 0 | 0 |
| Y | 1 | 1 | 1 | 0 | 0 | 0 |
| 1 | 0 | 1 | 0 | 0 | 0 | 1 |
| 3 | 0 | 1 | 0 | 1 | 1 | 0 |
| 6 | 0 | 1 | 1 | 0 | 0 | 1 |
| 7 | 0 | 1 | 1 | 0 | 1 | 0 |
| CS | 0 | 0 | 1 | 1 | 1 | 1 |
| EC | 0 | 1 | 1 | 1 | 1 | 1 |
| ISS | 1 | 1 | 1 | 1 | 0 | 0 |
| SM | 1 | 1 | 1 | 1 | 1 | 0 |

The $2^0$-$2^5$ bit positions of the messages correspond to the $C^0$-$C^5$ channels, respectively, of the criterion register 67 and the $F^0$-$F^5$ channels or positions, respectively, of the file register 30. The direction of tape or drum 130 travel is indicated by the arrow in FIGURE 3A. Each blank, or unmarked, bit position in the coded characters of FIGURE 3 corresponds to a binary zero. Reading from left to right, as viewed in FIGURE 3, the fifth items of the four messages are as follows:

FIGURE:
3A ------------------------------------- CY173
3B ------------------------------------- LY6731
3C ------------------------------------- MY17
3D ------------------------------------- MC173

It is to be noted that the number of characters in an item is not fixed, that is to say, the system may have a variable word or item length. The various item lengths are scaled in FIGURE 3 to demonstrate clearly this feature.

Assume that the total number of characters in a particular license number is not known, but that the second, fourth and fifth characters are "Y," "7," and "3," respectively. In the following example, it is desired to locate those messages wherein the second, fourth, and fifth characters of the fifth items are "Y," "7" and "3," respectively, without regard to item length, and without regard to other characters of the fifth items.

The search criterion is entered in the criterion register 67 (FIGURE 1A) in response to the CI control level now present from the control unit 20. The CI level activates the criterion input device 86, whereupon the new search criterion is transferred from the input device 86 to the criterion register 67 by way of the multichannel cable 87 and the fifth "or" gates 80. The single control pulse provided by the activated input device 86 resets the counter 68 by way of the sixth "or" gate 88, and sets the advance flip-flop by way of the second "or" gate 60. The "1" output of the set advance flip-flop 62 primes the fifth "and" gate 64.

The CI control level primes the first "and" gate 21 to allow the output of the local oscillator in the control unit 20 to trigger the clock generator 22. The $CK_4$ clock pulses are applied to one input of the third "or" gate 66, and the output of the third "or" gate activates the primed fifth "and" gate 64. The "and" gate 64 output clocks the new search criterion into the criterion register 67 and steps up the count in the counter 68. The feedback loop in the criterion register 67 circuit is disabled at this time because the CI control level is applied to the inhibiting inputs of the inhibit gates 78. The count detector 70 provides an output pulse in response to the $CK_2$ clock pulse when the counter 68 reaches a predetermined count equal to the number of clock pulses necessary to shift the first character of the new search criterion to the output, or last, stage of the criterion register 67. The output pulse of the count detector 70 resets the advance flip-flop 62 to prevent further clocking of the criterion register 67.

During the interval of time that the new search criterion is being written into the criterion register 67, the timing pulse generator 26 (FIGURE 1B) provides no timing pulses to the system, because the CI control level is applied to the inhibiting input of the inhibit gate 25, preventing the output of the first "or" gate 24 from reaching the timing pulse generator 26.

Figure 4:
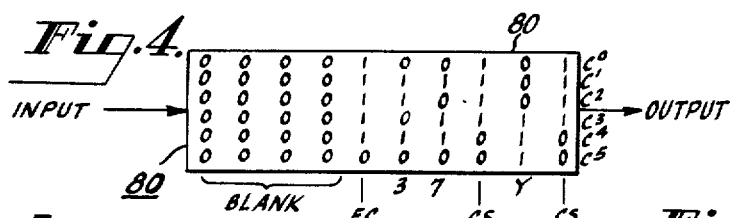
FIGURE 4 is a representative of a search criterion stored in the criterion register of FIGURE 1.

Assuming that each of the several registers in the criterion register 67 has ten stages, the information stored therein after entry of the new search criterion may be as illustrated in FIGURE 4. Criterion space (CS) masking symbols are stored in the first and third character positions, reading from right to left. An end of criterion masking symbol is stored in the sixth character position.

The search begins by terminating the CI control level, and applying a start comparison signal from the control unit 20 to the data selection device 36. Signals from the control unit 20 may be applied through the switching center 18 to the data file 14 to select and control the motion of a file unit, and the readout thereof to the file register 30. A series of timing pulses $TP_1$-$TP_4$ are generated by the TP generator 26 each time a new character is fed to the file register 30. The data selection device 36 is conditioned to operate in response to information stored in the file register 30 at this time. The CAFF(1) control signal is not supplied to the units 42, 44, 92 and 90 and these units, therefore, are non-responsive to the file register signals at this time.

The data selection device 36 is preset to provide an output signal upon recognition of the fifth ISS symbol entered into the file register 30 following an SM signal. This output signal resets the end of comparison flip-flop 48, and sets the start flip-flop 64 to prime the third "and" gate 54. Assume that the message of FIGURE 3A is being read by the reading heads (not shown) in the file 14 at this time.

The character "C" is next read into the file register 30 and a series of timing pulses are generated. In response to the $TP_1$ timing pulse, the primed third "and" gate provides an output which resets the counter 68 by way of the sixth "or" gate 88. The third "and" gate 54 output also sets the advance flip-flop 62, by way of the second "or" gate 60, and the comparison allowable flip-flop 56, and resets the second compare flip-flop 106 (FIGURE 1C). The "1" output, CAFF(1), of the comparison allowable flip-flop 56 is applied as one enabling signal to the recognition gates 90, 92 and the comparator of FIGURE 1C, and to the ISS recognition gate 42 and the fourth "and" gate 58 of FIGURE 1B. The $TP_2$ timing pulse is passed by the primed fourth "and" gate 58 to reset the start flip-flop 46.

The $TP_3$ timing pulse is applied to the character comparator 44. No output is provided by the comparator 44, however, because the character "C" stored in the file register 30 does not match the criterion space (CS) masking symbol stored in the output section of the criterion register 67. The space masking symbol is recognized, however, by the space symbol recognition gate 90, and an output is provided by this gate 90 in response to the $TP_3$ timing pulse. This output signal is gated by the seventh "or" gate 96 and sets the first compare flip-flop 102, thereby removing the priming signal from the sixth "and" gate 104. The $TP_4$ timing pulse is therefore not passed by the sixth "and" gate 104 to the set terminal of the second compare flip-flop 106.

The $TP_4$ timing pulse resets the file register 30, is gated by the third "or" gate 66 (FIGURE 1A) and the primed fifth "and" gate 64 to advance by one the count in counter 68, and is applied to the advance input terminal of the criterion register 67. The data in the criterion register 67 is shifted one position to the right, and the character "Y" is entered in the output stage thereof. The space masking symbol previously stored in the output stage is circulated to the input stage of the criterion register 67 by way of the feedback loop 76.

The character "Y" is next entered into the file register 30. This character matches the output of the criterion register 67. The first compare flip-flop 102 (FIGURE 1C) is reset by the $TP_1$ timing pulse. At $TP_3$, an output signal is provided by the character comparator 44 and passed by the seventh "or" gate 96 to again set the first compare flip-flop 102. The $TP_4$ timing pulse resets the file register 30 (FIGURE 1B), advances by one count the counter 68 (FIGURE 1A), and advances the data in the criterion register 67. A space masking symbol is now stored in the output stage of the criterion register 67.

The character "1" is next entered into the file register 30. Timing pulse $TP_1$ resets the first compare flip-flop 102 (FIGURE 1C). The space symbol is recognized by the space symbol recognition gate 90 and an output signal is obtained therefrom at $TP_3$. This output signal sets the first compare flip-flop 102 by way of the seventh "or" gate 96. At $TP_4$, the file register 30 is reset, the counter 68 (FIGURE 1A) is stepped up by one count, and the character "7" is shifted to the output section of the criterion register 64 and applied to the character comparator 44 (FIGURE 1C) over multichannel cable 90.

The character "7" is now entered in the file register 14 and applied to the character comparator 44, where a match is recognized. The $TP_1$ timing pulse resets the first compare flip-flop 102 (FIGURE 1C). This flip-flop 102 is set again at $TP_3$ by the output of the comparator 44, acting through the seventh "or" gate 96. The $TP_4$ timing pulse resets the file register 30, advances by one the count in the counter 68, and advances the character "3" to the output stage of the criterion register 67. A "3" is also entered in the file register 30, and recognized as a match in the comparator 44. The $TP_3$ timing pulse enables the comparator 44 output, which is applied through the seventh "or" gate 96 to the set terminal of the first compare flip-flop 102, whereupon the priming signal is removed from the sixth "and" gate 104 so that the $TP_4$ timing pulse cannot pass through the sixth "and" gate 104 to set the second compare flip-flop 106. The $TP_4$ timing pulse resets the file register 30, advances by one the count in the counter 68, and advances the data in the criterion register 67. The end of criterion masking character is now stored in the output stage of the criterion register 67.

The ISS symbol is next entered into the file register 30 and recognized by the ISS recognition gate 42. Timing pulse $TP_1$ resets the first compare flip-flop 102. Timing pulse $TP_2$ activates the ISS recognition gate 42 (FIGURE 1B), and an output therefrom sets the end of comparison flip-flop 48. The "1" output of this flip-flop 48 primes the second "and" gate 50 and is applied as a control level ECFF(1) to the seventh "and" gate 108 (FIGURE 1C). The output of the criterion register 67 is recognized in the end criterion recognition gate 92, and the $TP_3$ timing pulse activates the end of criterion recognition gate 92. The gate 92 output sets the override flip-flop 98 (FIGURE 1C) and is also passed by the seventh "or" gate 96 to set the first compare flip-flop 102. The next $TP_1$ timing pulse activates the seventh "and" gate 108 to provide a valid compare (VC) signal. Delayed timing pulse $TP_1$ passes through primed "and" gate 50 (FIGURE 1B) and resets the override flip-flop 98 and the comparison allowable flip-flop 56. The CAFF(1) control level is removed from the seventh "and" gate 108, recognition gates 42, 90 and 92, and comparator 44.

The valid compare signal is applied to the control unit 20 which, in turn, may control the readout of the message to a suitable external device (not shown). The valid compare signal may, in the case of a magnetic tape file, for example, cause the tape to stop and then back up to the start of the message so that the entire message may be read out to the external device by the same reading heads used in the search operation. Suitable circuitry and logic for performing this function are known. Where alpha-beta reading circuitry is employed, the valid compare signal may activate the beta circuitry. Alpha-beta reading circuitry is shown, for example, in the copending application of Howard P. Guerber and Stephen M. Fillebrown, Serial No. 556,128, filed December 29, 1955, now Patent No. 2,985,864, for "Sorting Device," and assigned to the assignee of the present invention.

As the tape continues to run, either in the forward or backward direction, the $TP_4$ timing pulses pass through the fifth "and" gate 64 (FIGURE 1A) to advance the counter 68 and advance the data in the criterion register 67. The count detector 70 provides an output in response to the $TP_2$ timing pulse when the counter 68 reaches a count of ten, the number of serial storage stages in the criterion register 67. The detector 70 output signal resets the advance flip-flop 62 (FIGURE 1A) to remove the priming signal from the fifth "and" gate 64. Further advance of the criterion data is thereby prevented, and the data stored in the register 67 at this time occupies the positions illustrated in FIGURE 4, that is to say, the criterion register 67 is now ready for the next message search.

The search on the message of FIGURE 3B proceeds along the lines described above. The first and third characters 'L' and '6' of the fifth item do not match the characters in the corresponding positions of the criterion register 67. However, these positions in the criterion register 67 are occupied by the special criterion masking symbols which are recognized by the space symbol recognition gate 90. The second, fourth and fifth characters are recognized as a match by the comparator 44. Consider now that the sixth message character "1" is stored in the file register 30. At this time, the output stage of the criterion register 67 stores an end of criterion masking symbol.

The end of criterion recognition gate 92 recognizes the special symbol stored in the output stage of the criterion register 67 and provides an output signal in response to the $TP_3$ timing pulse. This output signal is applied to the set terminal of the override flip-flop 98. The recognition gate 92 output signal is also applied, together with the "1" output of the override flip-flop 98 to the seventh "or" gate 96. The latter output is applied continuously to the seventh "or" gate 96 when the override flip-flop 98 is in the set state. The first compare flip-flop 102 is set by the output of the seventh "or" gate 96.

The $TP_4$ timing pulse resets the file register 30, advances by one the counter 68, and advances a blank character to the output stage of the criterion register 67. The ISS symbol is then entered in the file register 30. The $TP_1$ timing pulse resets the first compare flip-flop 102. The flip-flop 102 is immediately set again, however, by the "1" output of the override flip-flop 98. The ISS recognition gate 42 (FIGURE 1B) provides an output in response to the $TP_2$ timing pulse. This output sets the end of comparison flip-flop 48 to prime the second "and" gate 50 and to provide the ECFF(1) control level to the seventh "and" gate 108 (FIGURE 1C). The seventh "and" gate 108 then provides a valid compare (VC) signal in response to the next occurring $TP_1$ signal. The delayed $TP_1$ signal applied to the second "and" gate 50 resets the comparison allowable flip-flop 56 and the override flip-flop 98.

The search on the message of FIGURE 3C is similar to that described above through the fourth character of the fifth item. When the fifth character "3" is advanced to the output stage of the criterion register 67, the ISS symbol is entered in the file register 30. Timing pulse $TP_1$ resets the first compare flip-flop 102. An output is provided by the ISS recognition gate 42 (FIGURE 1B) in response to the $TP_2$ timing pulse. This output sets the end of comparison flip-flop 48 to provide a priming signal for the second "and" gate 50, and the ECFF(1) control level for the seventh "and" gate 108.

The character "3" in the criterion register 67 does not match the ISS character in the file register 30, however, and is not recognized by the space and end of criterion recognition gates 90 and 92. No signal is passed through the seventh "or" gate 96, therefore, and the first compare flip-flop 102 is not set at $TP_3$. The $TP_4$ timing pulse enables the primed sixth "and" gate 104, and the output thereof sets the second compare flip-flop 106 to remove the priming signal from the seventh "and" gate 108. No valid compare signal is derived from the seventh "and" gate 108 in response to the next $TP_1$ timing pulse.

Referring now to the fifth item of the message of FIGURE 3D, it is seen that the first and second data characters "M" and "C" from the file register 30 do not match the space masking symbol and the "Y," respectively, in the corresponding positions of the criterion register 67 (FIGURE 1A). The space masking symbol of the criterion register, however, is recognized by the space symbol recognition gate 90 (FIGURE 1C), as a valid comparison, and the recognition gate 90 provides an output signal for setting the first compare flip-flop 102 in response to the $TP_3$ timing pulse.

After the $TP_4$ timing pulse has terminated, the character "Y" is stored in the output stage of the criterion register 67. The character "C" is stored in the file register 30. Because the "Y" is not recognized by the space symbol and end of criterion recognition gates 90 and 92, no output is provided by either of these gates in response to the $TP_3$ timing pulse. The character comparator 44 provides no output because the "Y" and "C" do not match. Therefore, the first compare flip-flop 102 is not set at $TP_3$ and the sixth "and" gate 104 remains primed by the "0" output of the flip-flop 102. The sixth "and" gate 104 provides an output in response to the $TP_4$ timing pulse. This output sets the second compare flip-flop 106 to remove the priming signal from the seventh "and" gate 108. No valid compare signal can be obtained during the remainder of the item because the PMC reset pulse for the second compare flip-flop 106 is generated by the third "and" gate 54 (FIGURE 1B) only by the first $TP_1$ timing pulse following the fifth ISS character of a message.

The first character (space symbol) of the search criterion of FIGURE 4 may be omitted in each of the above examples, and the other criterion characters shifted one position to the right when a data selection device 36 of the type described in the copending Rivas application is used in the apparatus of FIGURE 1. The Rivas device may be set to provide a data selection pulse when the first character following the fifth ISS character of a message is present in the file register 30.

*Second example*

In the above examples, an end of criterion symbol (EC) occupies the sixth character position of the search criterion because the total number of characters in the reference license number is unknown. To further illustrate the flexibility of the invention, consider the following two cases:

(1) The second, fourth and fifth characters of the reference license number are "Y," "7" and "3," respectively, and it is known that there are only five characters in the license number, and (2) The second, fourth and fifth characters are "Y," "7" and "3," respectively, and it is known that there are six characters in the license number.

Figure 5:
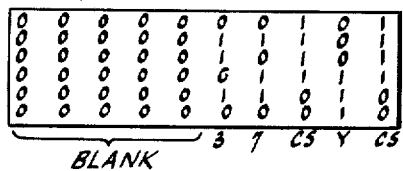
FIGURES 5 and 6 are examples of two other search criteria.

The search criterion for the first case is illustrated in FIGURE 5. Note that the end of criterion symbol is not used in this example. The sixth character position of the search criterion is occupied instead by a blank character. No valid compare signal may be obtained from the seventh "and" gate 108 unless the fifth character of the fifth item of the file message is followed directly by an ISS character. This is so because this ISS is used to set the end of compare flip-flop 48 which provides the ECFF(1) priming level to the seventh "and" gate 108 (FIGURE 1C), and because neither the comparator 44 nor the recognition gates 90, 92 provide an output in response to a blank character in the criterion register 67 output stage.

Figure 6:
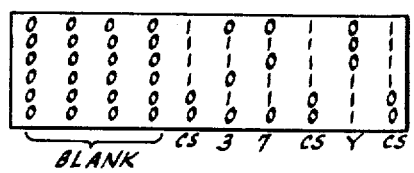

The search criterion for the second case is illustrated in FIGURE 6. A space symbol is entered in the sixth search criterion character position in the place of the unknown character. For reasons discussed above, no valid compare signal may be obtained from the seventh "and" gate 108 when the sixth character of the message license item is not followed by an ISS character.

The end data recognition gate 38 is provided in the search apparatus to recognize the end data signal (ED) recorded after the last message on a unit of the file 14. In the case of a magnetic tape file, this special signal generally follows the last message on each tape. The output of the end data recognition gate 38 (FIGURE 1B) is applied to the control unit 20 which, in turn, may communicate with the file 14 by way of the switching center 18 to cause the next tape to run and supply its output to the file register 30.

The last tape, or other storage unit, of the pertinent file of the data file 14 terminates with a special end of file (EF) symbol. The end of file recognition gate 40 recognizes this symbol and signals the control unit 20 that the entire file 14 has been searched.

Various modifications may be made in the apparatus of FIGURE 1 without departing from the spirit of the invention. For example, when a timing track is provided in the file 14, the timing pulses may be applied to trigger the timing pulse generator 26. The multichannel cable 23 and the first "or" gate 24 may then be replaced by a single channel cable.

It will be apparent that this search apparatus also may be used to search a message file 14 when the criterion of search is a fixed number of known characters occupying consecutive character positions. In this event, no special masking symbols are stored in the criterion register 67, and the space symbol recognition gate 90 and the end of criterion recognition gate 92 play no part in the search operations.

What is claimed is:

1. Apparatus for searching a data file for all messages stored therein which have predetermined message characters in selected character positions comprising, in combination with means for reading said file messages character by character: a search criterion register storing said predetermined characters in corresponding selected character positions and special masking characters in other character positions; a comparator connected to receive and compare character by character, the outputs of said reading means and said register and to provide a "compare" signal in response to the equality of characters being compared; a recognition device connected to receive the output of said register and to provide a "recognition" signal in response to each of said special masking characters; and signalling means connected to receive the "compare" and "recognition" signals.

2. A system for locating, in a data file, a block of data having certain predetermined multibit data characters appearing in selected ones of the character positions thereof comprising, in combination: a register storing said predetermined characters in register character positions corresponding to said selected character positions and storing special masking characters in other ones of the register character positions; reading means for reading the data in said file; a comparator connected to receive and compare the outputs of said reading means and said register, character by character, and for generating an output signal when two characters being compared are equal; a recognition device connected to the output of said register for providing an output signal in response to each of said special masking characters; and gate means connected to receive the output signals of said comparator and said recognition device.

3. A system for searching a data file for one or more blocks of data having certain predetermined, multibit data characters stored in selected character positions comprising, in combination: a register having character storage positions and storing as a criterion of search said predetermined characters in corresponding ones of said register character positions and storing special characters in other ones of said register character positions; a reading device for reading the data in said data file; means for comparing the read data with the data stored in said register and for generating a first equality signal for each equal character comparison; a recognition device connected to receive the output of said register for generating a second equality signal in response to each of said special characters regardless of the corresponding output of said reading device; and means responsive to a succession of first and second equality signals for signalling the correspondence between all of said predetermined data characters in a block of data and said register.

4. Apparatus for searching a message file to locate all messages having certain common information characters arranged in a predetermined sequence in selected portions of said messages comprising, in combination: means for storing a criterion of search which includes said common characters arranged in said sequence and special masking characters; reading means for said file; comparator means connected to receive and compare the outputs of said reading means and said criterion storage means; recognition means connected to receive the output of said criterion storage means and to provide an output in response to the receipt of a special masking character; and information selection means responsive to the output of said reading means for providing control signals to said comparator means and said recognition means during the reading of said selected portions of said messages.

5. In combination with a data file for storing a plurality of messages each comprising a train of multibit characters, apparatus for searching said file for a message having specified characters stored in certain nonconsecutive character positions of said message, said apparatus comprising means for storing as a criterion of search said specified characters stored in corresponding said nonconsecutive character positions of said criterion store and special masking characters stored in other character positions of said criterion store, means for reading said messages in said file, a comparator connected to receive and compare serially by character the outputs of said reading means and said criterion store and to provide a compare signal each time said output characters are equal, and recognition apparatus connected to the output of said criterion store and responsive to each of said masking characters for providing a compare signal in response thereto.

6. Apparatus for searching a data file for all messages stored therein having predetermined like message criteria indicia present in the same nonconsecutive indicia positions, said apparatus comprising a storage register for storing representations of said like indicia in register positions corresponding to said indicia positions and for storing special indicia representations in others of said register positions, means for scanning said messages, means connected to said scanning means for extracting the message criteria from said scanned messages, a comparator connected to receive and compare said representations and the extracted said message criteria, recognition apparatus connected to the output of said register and responsive to each of said special indicia representations for providing an output in response thereto, and signalling means connected to the outputs of said comparator and said recognition means for signalling upon identity of said predetermined indicia representations and corresponding said message indicia.

7. In combination with a data file wherein messages are stored in the form of coded characters, and means for reading said messages and providing signals representative of said characters, apparatus for locating all messages which have certain common characters in predetermined nonconsecutive character position comprising: a register having character positions and storing said common characters in corresponding nonconsecutive ones of said register character positions, and special masking characters in others in others of said register character positions; a character comparator connected to receive the outputs of said reading means and said register for providing an identity signal upon each identity of character inputs thereto; a recognition device connected to receive the output of said register and to provide an identity signal in response to each of said masking characters; and means connected to the outputs of said comparator and said recognition device and responsive to each said identity signal for signalling when said common characters in said register are matched by characters in corresponding positions of the message being read by said reading means.

8. Apparatus for searching a message file for all messages stored therein having certain predetermined characters in common stored in a selected portion of each of said messages comprising, in combination, a search criterion register storing said predetermined characters and other special masking characters, a character comparator means connected to the output of said register, file output means for presenting to said comparator the message output of said file seriatim by character, said comparator providing an equality signal each time the simultaneous character inputs thereto are equal, special masking character recognition means connected to receive the output of said register and responsive to said special masking characters for providing an equality signal, data selection means connected to the output of said file output means for providing a control signal during each said selected portion, and signalling means conditioned by said control signal and responsive to each said equality signal for generating a valid compare signal when said predetermined characters in said register are matched character for character by the output of said file output means.

9. Apparatus for searching a message file for all messages stored therein having certain predetermined characters in common stored in a selected portion of each of said messages comprising: a search criterion register storing said predetermine characters and other special masking characters; a character comparator means connected to the output of said register; file output means for presenting to said comparator the message output of said file seriatim by character, said comparator providing an equality signal each time the simultaneous character inputs thereto are equal; recognition gate means connected to the output of said register and responsive to said special masking characters for providing an equality signal; and signalling means responsive to each said equality signal for generating a valid compare signal when said predetermined characters in said register are matched character for character by the output of said file output means.

10. Apparauts for searching a message file for all messages stored therein having certain predetermined characters in common stored in a selected portion of each of said messages comprising: a search criterion register storing said predetermined characters and other special masking characters; a character comparator means connected to the output of said register; a file output means for presenting to said comparator the message output of said file seriatim by character, said comparator providing an equality signal each time the simultaneous character inputs thereto are equal; recognition gate means connected to the output of said register and responsive to said special masking characters for providing an equality signal; data selection means connected to the output of said file output means for providing a control signal during each said selected portion for enabling the outputs of said comparator and said masking character recognition gate means; and signalling means conditioned by said control signal and responsive to each said equality signal for generating a valid compare signal when said predetermined characters in said register are matched character for character by the output of said file output means.

11. In a data processing system having a message file wherein each message contains one or more items of information, each of said items having a plurality of ordered information characters, said system including means for selecting all items having a given group of said information characters, said group including either sequential or non-sequential ones of said ordered characters, the combination comprising: a register for receiving a select criterion, said select criterion including said given group of characters and other special characters; a comparing means connected for receiving said select criterion and a corresponding item from each said message, means for applying said characters of said criterion and like ordered characters of each said corresponding item to said comparing means, item by item, said comparing means providing an output signal each time equal characters are received; a recognition means coupled to said register and providing an output signal in response to each special character; and signalling means connected to receive said comparator and said recognition means output signals.

12. In combination with a data file containing a plurality of messages represented by coded signal character combinations, each of said messages having a criterion portion, and means for reading said messages, apparatus for locating in said file a message having certain predetermined characters recorded in non-sequential character positions of the criterion thereof comprising, in combination: a memory for storing a search criterion for comparison with each said criterion portion, said search criterion including said predetermined characters stored in corresponding said non-sequential character positions and special characters stored in others of said character positions; means for generating timing pulses in response to the output of said reading means; information selection means connected to the output of said reading means for providing a control signal during the reading of each said criterion portion; a comparator connected to the outputs of said memory and said reading means for providing an output signal when simultaneous character inputs thereto are equal; means enabled by said control signal and activated by ones of said timing pulses for gating said search criterion characters out of said memory to said comparator; a recognition means connected to the output of said memory for providing an output in response to each special character input thereto; and signalling means responsive to the outputs of said comparator and said recognition means.

13. In combination with a message file containing a plurality of recorded messages, each of said messages comprising a train of characters grouped into items, one item of each message containing a message criterion, and means for reading said messages and for generating electrical signals representing said characters, apparatus for locating in said file all messages having certain predetermined characters in selected character positions of the message criteria comprising, in combination: a criterion register having character storage positions and storing as a criterion of search said predetermined characters in corresponding said register character positions, and a special end of criterion symbol following the last criterion character in said register; a comparator connected to receive and compare said electrical signals character by character with said search criterion and to generate a signal indicating equality whenever the characters being compared are equal; a recognition device connected to the output of said register for recognizing said end of criterion symbol and for generating a signal in response thereto; settable signal generating means set by the output of said recognizing device; indicating means connected to the outputs of, and enabled by a certain continuous sequence of input signals from, said comparator and said signal generating means for generating a signal indicating that the message being read has said predetermined characters in said selected character positions; and means responsive to said electrical signals for recognizing the termination of the item being read by said reading means and for resetting said settable signal generating means and for activating said enabled indicating means.

References Cited by the Examiner

UNITED STATES PATENTS 2,721,990 10/55 McNaney _____ 340—172.5
2,885,659 5/59 Spielberg _____ 340—172.5

OTHER REFERENCES

Handbook of Automation, Computation and Control, vol II, Grabbe, Ramo, Wooldridge, John Wiley and Sons, 1958.

MALCOLM A. MORRISON, *Primary Examiner.*

EVERETT R. REYNOLDS, IRVING L. SRAGOW,
*Examiners.*